March 4, 1969    R. E. PHILLIPS    3,430,415
TESTING DEVICE

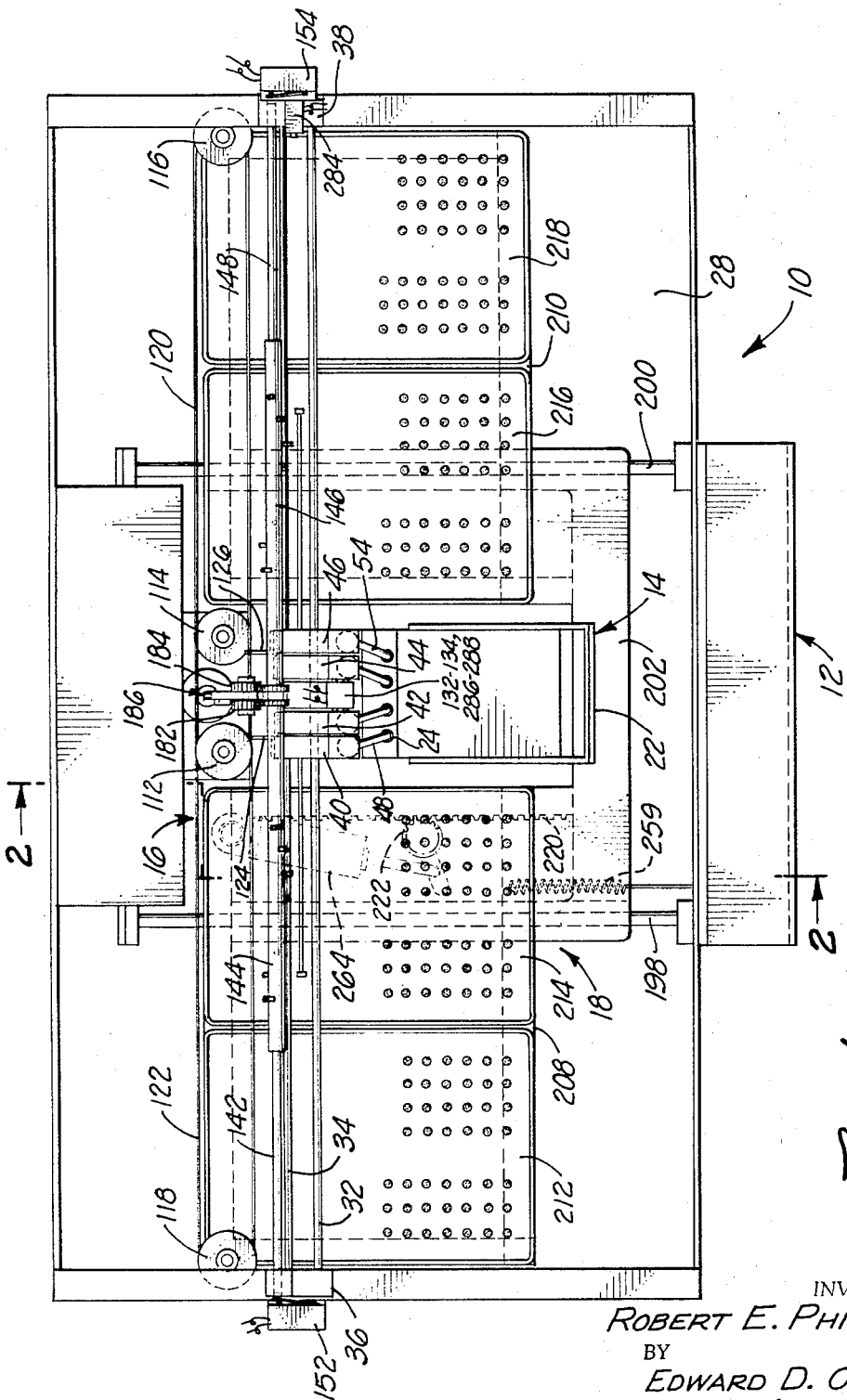

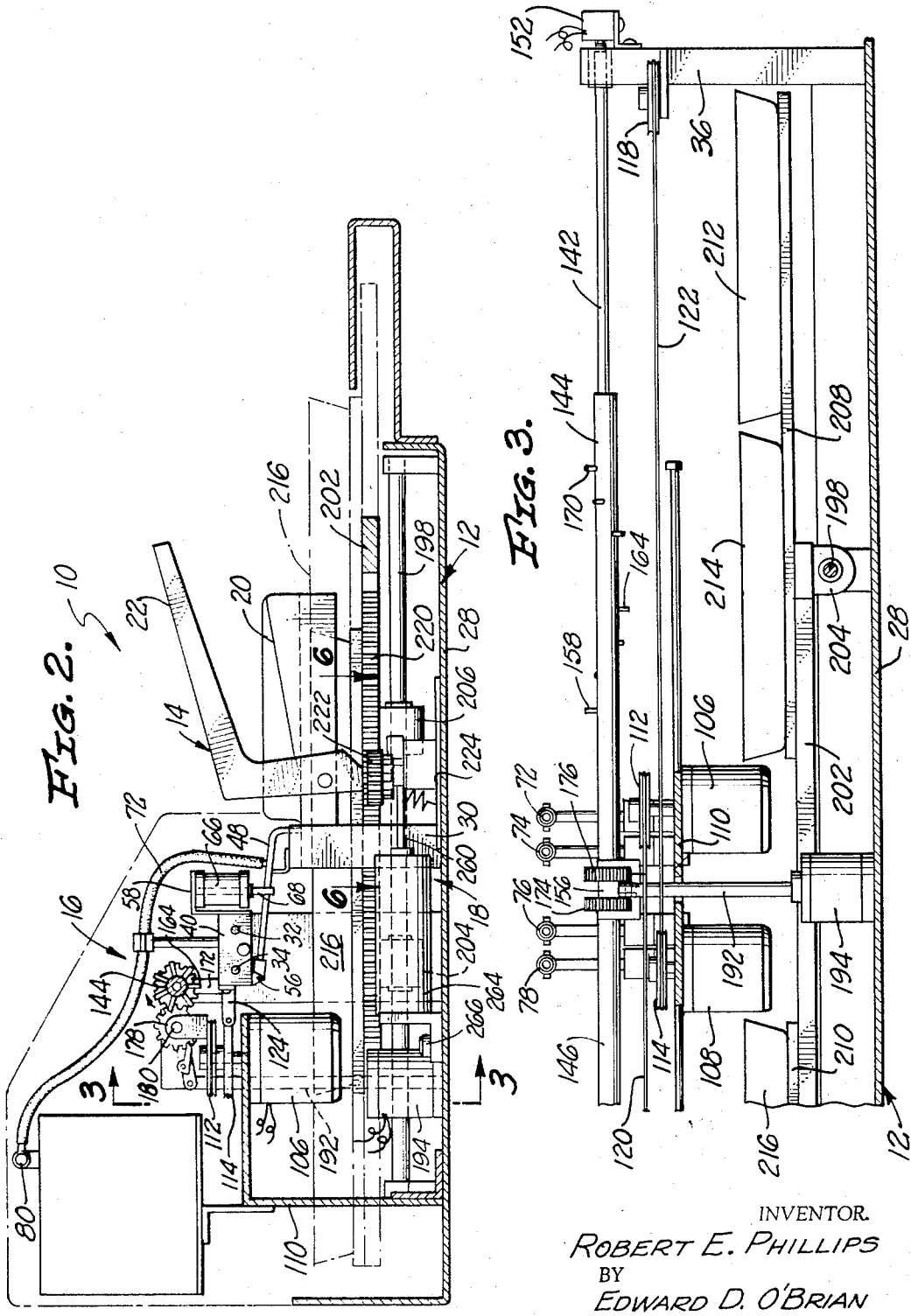

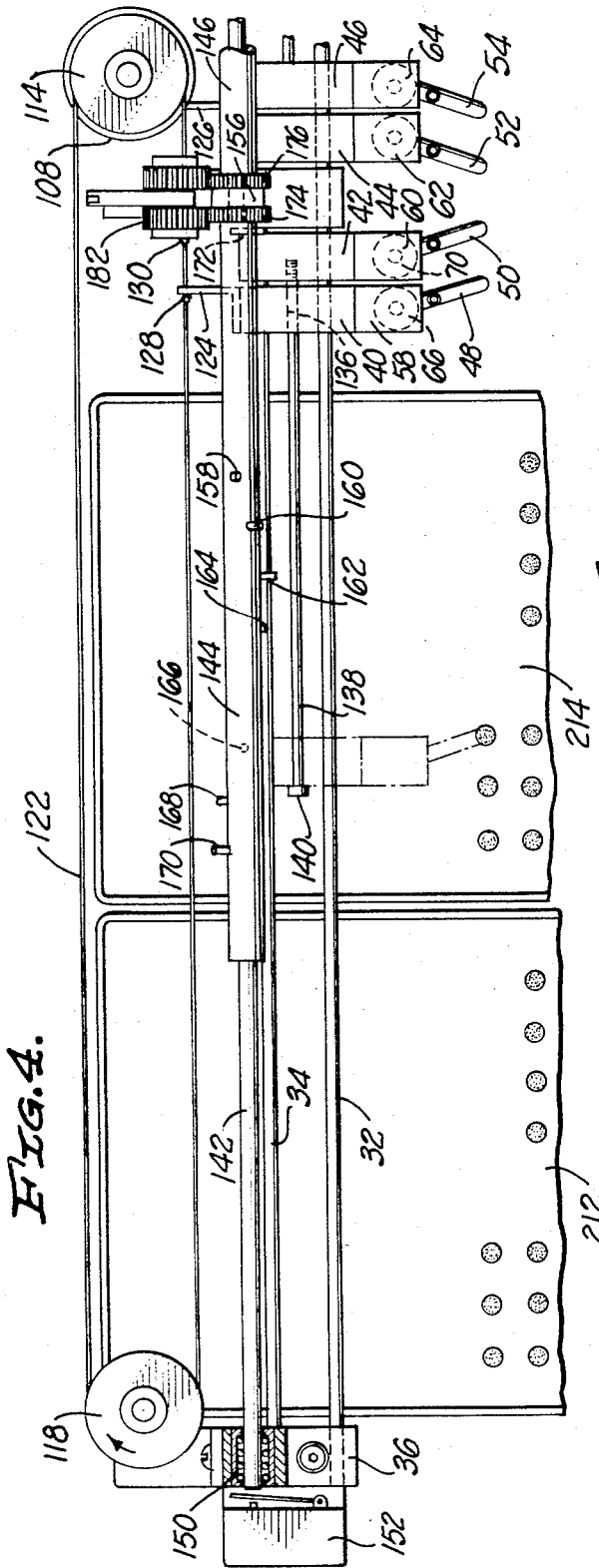
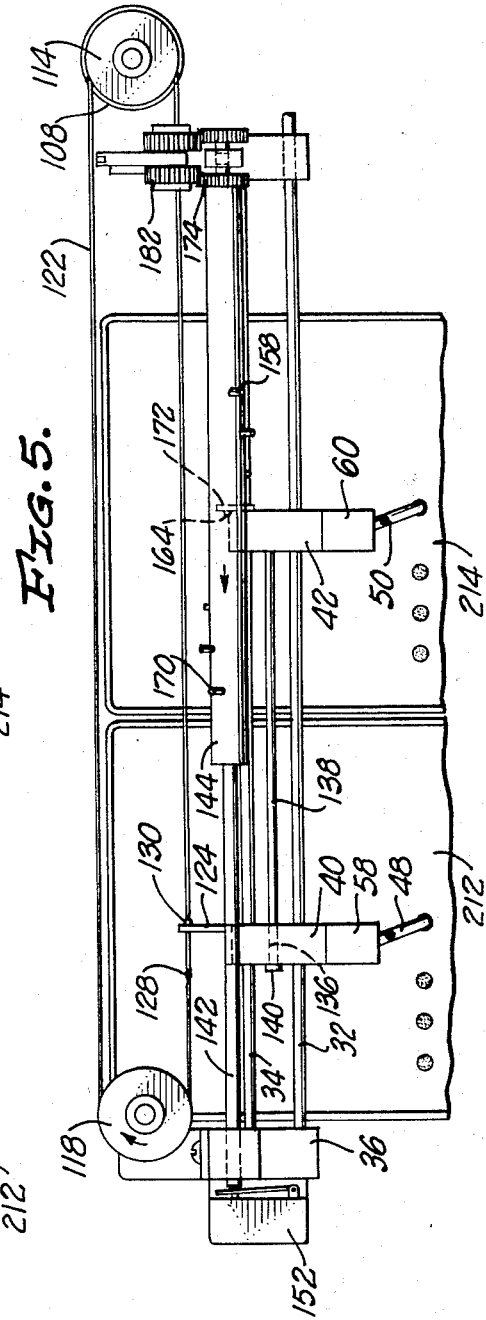

Filed Oct. 4, 1965    Sheet 4 of 5

INVENTOR.
ROBERT E. PHILLIPS
BY
EDWARD D. O'BRIAN
ATTORNEY

FIG. 8.

INVENTOR.
ROBERT E. PHILLIPS
BY
EDWARD D. O'BRIAN
ATTORNEY

United States Patent Office 3,430,415
Patented Mar. 4, 1969

3,430,415
TESTING DEVICE
Robert E. Phillips, P.O. Box 1102,
Studio City, Calif. 91604
Filed Oct. 4, 1965, Ser. No. 492,466
U.S. Cl. 53—123                                  19 Claims
Int. Cl. G01n *1/04;* B26d *7/06;* B25b *35/28*

ABSTRACT OF THE DISCLOSURE

A testing device is disclosed which receives a member containing body fluid specimens, punches a number of specimens from said member, and then distributes said specimens in a plurality of culture trays. The distributing means and trays are constructed so as to make it possible to put the specimens in identical locations in each of the trays.

---

This invention is directed to a testing device, particularly arranged for the deposition in a predetermined orientation of a plurality of test coupons, so that they are conveniently arranged for testing, and so that they can be readily identified from their position.

A number of tests can be performed on human body fluids to determine the metabolic balance of the body. A number of these tests are capable of being performed by impregnating the fluid into a suitable carrier, such as paper and culturing the impregnated paper or other carrier under appropriate culture conditions. One of the particular medical tests for metabolic error is the phenylketonuria test. This testing procedure is often abbreviated as P.K.U. A number of other tests are known, and some of them relates to similar inborn errors of metabolism while others relate to subsequently developed metabolic imbalance and yet others are related to significant departures from normal in the bodily fluid balance caused by defects which were originally received from externally of the body, such as virus produced effects. In the P.K.U. test, and other tests, it is necessary to place the carrier impregnated with body fluid in an appropriate culture medium and to place the combined culture medium, body fluid and its carrier into a proper environment for culture growth. When a large number of such culturing of individual carriers having body fluids impregnated therein is necessary, a large amount of hand work is necessary if no equipment is available to handle the carriers and correctly deposit them in the culture medium.

Accordingly, it is an object of this invention to provide a device which acts upon coupons carrying a body fluid specimen and accurately and properly positions them quickly and with minimum inconvenience and effort upon a proper culture medium.

It is a further object of this invention to provide handling equipment which deposits coupons carrying specimens into a culture tray and arranges a plurality of such coupons in a culture tray so that a plurality of coupons can be tested simultaneously in a single culture tray.

It is a further object of this invention to provide equipment which acts upon specimen coupons so as to act upon a plurality of them at one time and deposit each in a corresponding position in a different culture tray so that a plurality of such culture tests can be carried on at the same time so as to check the accuracy of each culture, or alternatively to perform different tests upon the same specimen carriers by using different cultures or different culture environment so that cross-checking and multiple testings is possible.

It is another object of this invention to provide specimen coupon handling and transport equipment which is economic of construction, accurate in use and free of excessive maintenance so as to perform for a long life.

Other objects and advantages of this invention will become apparent from a study of the following portion of the specification, the claims and the attached drawings in which:

FIG. 1 is a top plan view of the handling device of this invention;

FIG. 2 is an elevational view taken generally along the line 2—2 of FIG. 1;

FIG. 3 is a section taken generally along the line 3—3 of FIG. 2;

FIG. 4 is a partial top plan view showing the left end of the corner mechanism in the home position;

FIG. 5 is a view similar to FIG. 4 showing the carrier equipment in the transfer position;

FIG. 8 is a schematic electrical diagram of a portion of the equipment of this invention.

Figure 6:
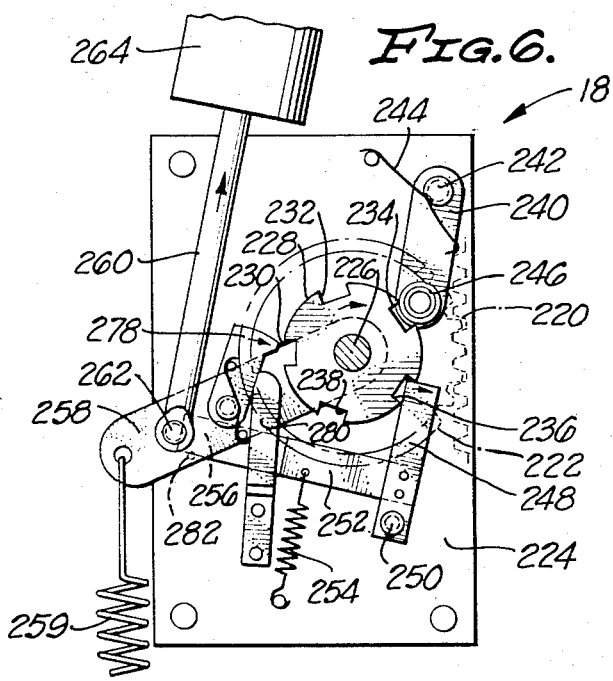
FIG. 6 is an enlarged section taken generally along the line 6—6 of FIG. 2.

As an aid to understanding this invention it can be stated in essentially summary form that it is directed to equipment particularly adapted for the handling, transport and positioning of coupons carrying body fluid specimens. The equipment is arranged to punch such coupons from a card, and to individually pick up such coupons and transport them to a culture medium tray. The coupons are accurately positioned by the equipment in the culture medium tray. A plurality of operations of the machine deposits a plurality of such coupons in the trays, and each of such coupons is accurately positioned in the tray so that its source may be later identified. Preferably the equipment deposits a plurality of such coupons at the same time in a plurality of different trays and arranges each of the trays so that the coupons are arranged in corresponding manner for identification. Such positioning is accomplished by providing coupon carriers which travel the correct distance, and by positioning the tray appropriately with respect to the carrier.

This invention will be understood in greater detail by reference to the following portion of this specification wherein the drawings are described in detail. Referring now in particular to FIGS. 1 and 2, the handling equipment of this invention is generally indicated at 10. The handling equipment primarily comprises base 12, punch section 14, transport and transport stop section 16, and tray support and positioning structure 18. These structures cooperate together and are inter-related so that coupons punched on the punch section 14 are automatically and appropriately positioned in the various trays.

In the P.K.U. test, and other similar tests on body fluids, the fluids are saturated into certain areas in a filter paper card. The remainder of the card preferably carries patient identification, and the like. The desirable activity of this equipment includes the punching of coupons from the saturated areas of the card and depositing these coupons in culture trays in proper arrangement so that they may be cultured. Punch section 14 has a card surface 20 into which a filter paper card carrying an area saturated with the body fluids is inserted. Punch section 14 is mechanically conventional and includes a manually operable punch handle 22 which causes four circular punches to move upward from below the filter paper specimen carrier to move through the filter paper into four corresponding circular dies. This activity cuts four body fluid specimen carrying coupons from the filter paper and moves them into the circular die openings. One of these die openings is indicated at 24 and the other three are in line with it. Switch 26, see FIG. 8, is located within punch structure 14 and is normally open. Switch 26 is closed upon depression of punch handle 22 and the punching of the coupons.

Base 12 has bottom plate 28 upon which the remainder of the structure of equipment 10 is mounted. Post 30 carries punch section 14 so as to rigidly support the punch. Suitable guards, covers and shields are attached to bottom plate 28 as well as the necessary support post and brackets for supporting the various parts.

Guide rails 32 and 34 are supported on posts 36 and 38 so that they extend across the equipment 10 from one side to the other thereof. Rails 32 and 34 are preferably cylindrical and are supported to be parallel so that they may act as guide rails for the hereinafter described coupon carriers. Coupon carriers 40, 42, 44 and 46 are mounted upon rails 32 and 34 so as to be able to move along the length thereof. Each of the coupon carriers carries a pivoted pickup arm. Pickup arms 48, 50, 52 and 54 are respectively pivotally carried upon carriers 40 through 46. As is seen in FIG. 2, pickup arm 48 is pivoted upon the bottom of carrier 40 at pivot point 56. Each of the other pickup arms is pivoted to its respective carrier in similar manner.

By means of brackets 58, 60, 62 and 64 solenoids are secured to the front faces of the coupon carriers. As is seen in FIG. 2, solenoid 66 is secured to bracket 58 and has its plunger 68 connected to pickup arm 48. Thus, when solenoid 66 is actuated, pickup arm 48 is lifted. Similarly, solenoid 70, see FIG. 4, is connected to lift pickup arm 50, and solenoids 72 and 74, see FIG. 8, are respectively connected to pickup arms 52 and 54. When the coupon carriers are at the central or home position shown in FIGS. 1 and 4, and the solenoids are deenergized, the pickup arms rest in the die openings 24 and have their open ends facing downwardly toward the coupons just punched from the card and lift them into the die opening. Thus, when vacuum is supplied to the pickup arms, the coupons are picked up on the open ends thereof and are retained thereon.

Figure 7:
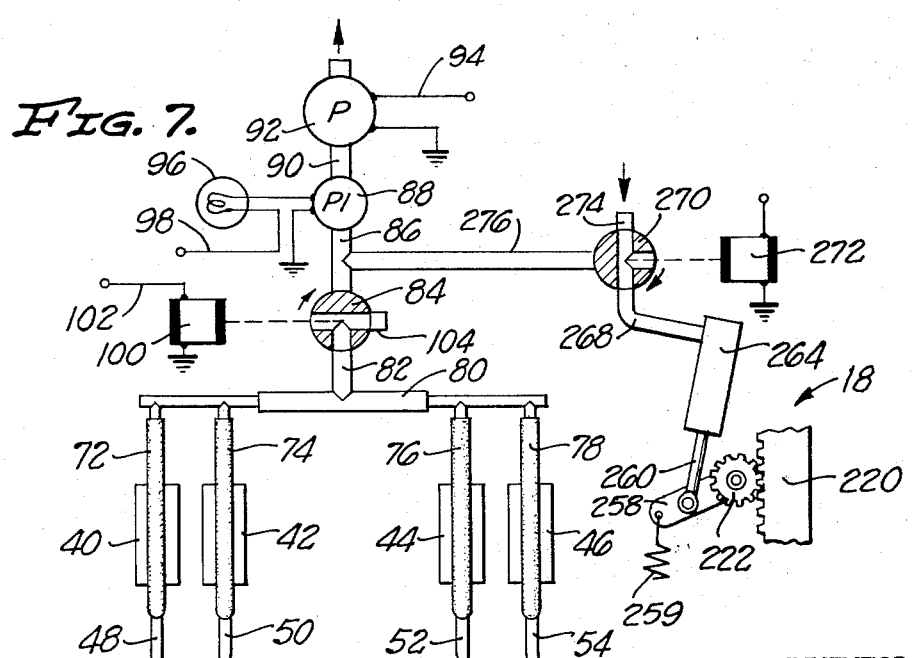
FIG. 7 is a schematic pneumatic diagram of a portion of the equipment.

As is shown in FIG. 7, each of the pickup arms is connected by means of a flexible tube, these tubes are shown at 72, 74, 76 and 78. These tubes are of sufficient length so as to permit the pickup arms to move with their respective carriers for positioning the coupons, as is described below. Each of the flexible tubes 72 through 78 is connected to vacuum manifold 80. Vacuum manifold 80 is in turn connected by line 82 to vacuum valve 84. Vacuum valve 84 is connected by vacuum line 86 to pressure switch 88. Pressure switch 88 is connected by line 90 to vacuum pump 92. Pump 92 is powered by electric line 94. Pressure switch 88 is serially connected between lamp 96 and power supply 98 and is arranged so that when adequate vacuum is present in line 86, lamp 96 is illuminated so as to indicate that the portion of the system is ready for operation. Valve 84 is controlled by solenoid 100, and solenoid 100 is powered by line 102. The energized position is shown in FIG. 7, and in this position line 82 is open to atmosphere vent 104. In the energized condition no vacuum is present in the pickup arms. However, when solenoid 100 is deenergized, the valve plug of valve 84 is turned clockwise so as to close the atmosphere vent 104 and open up line 82 to line 86. In this position vacuum is present in the pickup arms.

As was previously described, the several carriers are movably mounted along the length of rails 32 and 34. Transfer motors 106 and 108 are mounted upon bracket 110, see FIG. 2, and are positioned generally rearwardly of punch section 14. These motors respectively carry drive pulleys 112 and 114 so that rotation of a motor causes respective rotation of its drive pulley. As is best seen in FIG. 3, drive pulleys are located at slightly different heights. Pulleys 116 and 118 are respectively located in horizontal alignment with drive pulleys 112 and 114. Flexible drive element 120 is arranged around pulleys 112 and 116. It is sufficiently flexible to be able to bend around the pulleys, and yet be of long life, and is sufficiently strong so as to be able to drive carriers 44 and 46 along their rails. Similarly, flexible drive element 122 passes around pulleys 114 and 118. It has the same physical characteristics. A suitable polymer composition material cord is satisfactory for this purpose and some braided or twisted metallic flexible drive elements are also suitable for this purpose. It is seen that as motor 106 is rotated, element 120 moves around its pulleys. Similarly, as motor 108 rotates, element 122 is moved around its pulley.

As is seen in FIGS. 1, 4 and 5, carrier 40 has bracket 124 secured to the rear end thereof and bracket 124 has a hole therein through which element 122 passes. Similarly, carrier 46 has bracket 126 secured at the rear thereof, and element 120 passes through a hole in bracket 126. The structure of the left end of this portion of the equipment 10 is best seen in FIGS. 4 and 5. It is understood that the right end is substantially symmetrical. Therefore, the left end is best described. As seen in FIGS. 4 and 5, element 122 has spaced enlargements 128 and 130 thereon. These enlargements may either be a knot in the cord, or may be drive enlargements clamped upon the element 122. These enlargements are larger than the hole in bracket 124. Thus, movement of the drive element 122 causes one or the other of the enlargements to engage upon bracket 124 to drive carrier 40 along its rails 32 and 34. It can be noted at this juncture that switches 132 and 134 are positioned beneath carriers 40 and 46, respectively, when these carriers are in the home position illustrated in FIG. 4. Switches 132 and 134 are normally open switches, and are closed when the carriers actuate them by being present in the home position.

Carrier 40 has hole 136 therethrough. Stop bar 138 passes through hole 136 and is fixed in carrier 42. Stop bar 138 has head 140 which is larger than hole 136. Thus, as carrier 40 is driven to the left by appropriate rotation of motor 108 and movement of element 122, so that enlargement 130 engages on bracket 124 to move carrier 40 to the left as seen in FIG. 4. As carrier 40 moves to the left, it moves freely over stop bar 138 until head 140 engages upon the left side of carrier 40. Thereafter, both carriers 40 and 42 are moved to the left until they are stopped. A similar structure is provided at the right side of equipment 10, and motor 106 is driven at the same time as motor 108 so that the carriers on the right are moved to the right while the carriers on the left side are moved to the left.

Stop shaft 142 and stop shaft 144 are secured together. They may be of unitary construction, if desired, and the larger diameter of stop shaft 144 can continue all the way to the end of the machine, if desired. Stop shafts 146 and 148 are similarly provided at the right side of the machine, as seen in FIG. 3.

Stop shaft 142 is mounted in post 36 upon bearing 150 which permits longitudinal motion of stop shaft 142 and rotary motion thereof. Normally closed switch 152 is mounted adjacent the end of the stop shaft 142 so that upon axial motion thereof in the order of 1/16 of an inch, normally closed switch 152 is opened. A similar switch 154 is seen in FIG. 1. Both shafts 144 and 146 are mounted for sliding and rotation in bearing 156.

Stop shaft 144 has a plurality of stop lugs located thereon. Stop lugs 158, 160, 162, 164, 166, 168 and 170 are seen thereon in FIG. 4. Each of these stop lugs is axially spaced along stop shaft 144, and each is spaced around the shaft so as to be positioned in a spiral. Carrier 42 has stop 172 secured thereto. Stop 172 extends upwardly under the center line of stop shaft 144, as is seen in FIG. 2, but does not quite reach the cylindrical exterior of this shaft. However, stop lugs 158 through 170 are sufficiently long in relation to the length of stop 172 so that the stop 172 engages upon the stop lug which is positioned downward. Thus, when carrier 42 is moved to the left by motion of carrier 40, it moves until stop 172 engages upon the stop lug which is extending downwardly. In FIGS. 2, 4 and 5, stop 172 engages upon stop lug 164. This engagement causes leftward motion of stop shafts 144 and 142 so that the end of stop shaft 142 actuates switch 152. A similar construction is provided on the right hand side of the equipment 10. The actuation of these switches causes further activity, as is described below. The positioning of the various stop lugs on the stop shaft controls the end of travel of the coupon carrier so that they can deposit coupons in uniform columns. These stop lugs are arranged on stop shaft 144 and 146 in such a manner that the position of coupon deposition proceeds in the same direction, left to right, by all four carriers.

After each coupon deposit, rotation of stop shafts 144 and 146 brings a new stop lug into position so that the next deposit will be in a different column on the trays on which the coupons are deposited. Gears 174 and 176, see FIGS. 3 and 4, are respectively fixed to stop shafts 144 and 146. Yoke 178 is mounted adjacent these gears and carries shaft 180. Gears 182 and 184 are fixed to shaft 180 and are positioned to be respectively in engagement with gears 174 and 176. Gears 182 and 184 are sufficiently wide and are spaced so that the gears remain in engagement when the stop shafts 144 and 146 are moved axially.

Ratchet structure 186, see FIG. 1, is mounted between gears 182 and 184. As is seen in FIG. 8, lever 188 is pivoted upon shaft 180 and carries pawl 190 which is spring loaded with respect to the teeth of gear 182. The end of lever 188 is connected to plunger 192 of solenoid 194. Furthermore, stop pin 196 is secured to the frame and positioned adjacent pawl 190. When solenoid 194 is energized, plunger 192 moves upward to swing lever 188 clockwise about shaft 180. Pawl 190 is released from stop pin 196 and is permitted to ratchet into a new tooth space. Thereupon, deenergization of the solenoid 194 permits lever 188 to move counterclockwise. Pawl 190 is retained in the tooth space by spring action and gear 182 moves counterclockwise until pawl 190 engages on stop pin 196, which locks the entire structure. Gear tooth engagement between gear 182 and gear 174 causes clockwise motion, as seen in FIG. 2, of stop shaft 144 by one increment to bring a new stop lug into position. Similarly, stop shaft 146 rotates an identical amount in the same direction to bring the stop into position on the right side of the machine.

The tray support and positioning structure 18 comprises rails 198 and 200 which are supported upon suitable brackets extending from bottom plate 28 so that they are positioned parallel to each other and extend from front to back of the device 10. Yoke 202 is supported upon four bearings which extend downwardly so that two of them embrace each of the rails 198 and 200. Two of these bearings are shown at 204 and 206. Yoke 202 is arranged to extend around the front of punch section 14 and extends back on each side thereof so as to tie the two sides of the tray support in positioning structure together. Tray carrier plate 208 is supported on the left arm of yoke 202 while tray carrier plate 210 is supported on the right arm of yoke 202. Trays 212 and 214 are positioned on tray carrier plate 208 while trays 216 and 218 are positioned on tray carrier plate 210.

In order to control the front to rear position of these trays, rack 220 is secured to the bottom of yoke 202. Gear 222 is positioned to be in engagement with rack 220. The tray positioning structure is best seen in the detail of FIG. 6 wherein rack 220 and 222 are above the plane at which the section of FIG. 6 is taken. Mounting plate 224 is secured to bottom plate 28. Mounting plate 224 rotatably carries shaft 226 upon which gear 222 is fixed. Shaft 226 also carries detent wheel 228 which is fixed thereto so as to rotate with gear 222. Detent wheel 228 has five equally spaced detent notches 230, 232, 234, 236 and 238. Detent 240 is in the form of an arm pivoted at 242 and loaded by spring 244 to urge detent roller 246 firmly into the detent notch 234.

Stop 248 is pivoted at 250 on mounting plate 224. Stop 248 carries stop operating lever 252. Spring 254 is secured to the stop operating lever 252 and to base plate 224 to urge stop 248 into detent notch 236. Operating lever 252 is in the form of a flat spring and has its upper edge at 256 bent downward away from the plane of the drawing of FIG. 6.

Advance lever 258 is pivoted on shaft 226 and at its outer end carries spring 259 which is secured to base plate 228 to urge lever 258 toward the position shown. Piston rod 260 is pivotally mounted at 262 on lever 258. Piston rod 260 terminates in cylinder 264 and carries a piston therein. As is seen in FIG. 2, cylinder 264 is pivoted to base plate 28 at pivot 266. As is seen in FIG. 7, cylinder 264 is connected by vacuum line 268 to valve 270. Valve 270 is operated by solenoid 272. Valve 270 is a three-way valve opened by line 274 to atmosphere and line 276 to line 86. In the position shown, with the solenoid 272 non-energized, atmosphere line 274 is open to line 268 so no vacuum is present in cylinder 264 and rod 260 is extended under the influence of spring 259. When solenoid 272 is actuated, valve 270 turns 90° to the right and line 276 is open to line 268 to apply vacuum to the interior of cylinder 264 to draw the piston upward and rod 260 into the cylinder.

Referring again to FIG. 6, pawl 278 is pivotally mounted on lever 258. Furthermore, a suitable spring urges pawl 278 clockwise about its pivot. Finger 280 is mounted upon mounting plate 224 and extends up into the area of pawl 278 to maintain it adjacent detent notch 230. Furthermore, pin 282 on the under side of lever 258 engages under the bottom edge of operating lever 252. By this construction, when the piston rod 260 is drawn into the cylinder, during the first part of the stroke pin 282 acts upon lever 252 to move stop 248 out of detent notch 236. The shape of finger 280 is such that it permits pawl 278 to enter detent notch 230, and continued upward motion of rod 260 causes rotation of advance lever 258 about shaft 226 so that engagement of pawl 278 with notch 230 causes rotation of detent wheel 228 in the clockwise direction. The torque is sufficient to roll detent roller 246 out of detent notch 234. As movement proceeds, notch 236 leaves the position adjacent the front end of stop 248, and pin 282 moves around the end of operating lever 252. Spring 254 draws stop 248 against the outer surface of detent wheel 228 to ride therealong. As motion proceeds, the end of stop 248 is ultimately reached by detent notch 234. Stop 248 arrests motion when one-fifth turn of detent wheel 228 has been accomplished. Detent roller 246 snaps into notch 232 to aid in maintaining wheel 228 in this position. Upon return stroke of rod 260 under the influence of spring 259, the end of pawl 278 rides around the exterior surface of the detent wheel until it is adjacent notch 238. Thereupon finger 280 moves pawl 278 away from the detent wheel. Stop 248 remains in the position shown, and the pin 282 moves under the bent edge 256 and displaces operating lever 252 so that pin 282 passes next to operating lever 252 until the position shown is reached. Thereupon operating lever 252 snaps into the position shown. Since gear 222 is mounted on shaft 226, it rotates therewith. Such rotation of gear 222 drives rack 220 to move the rack downward as is seen in FIG. 1. The motion of the rack moves yoke 202 and tray carrier plates 208 and 210, and the trays carried thereon so that the trays can receive a new row of coupons.

The above described tray moving structure has been described as being powered by cylinder 264 which in turn is controlled by valve 270 which is actuated by solenoid 272. Switch 284, see FIG. 8, is electrically connected to control solenoid 272. Switch 284 is positioned at post 38 in such a position that it is closed by carrier 46 when the carrier 46 is in its rightmost position, in engagement with the rightmost stop lug on stop shaft 146. Thus, switch 284 is closed only when carrier 46 is in its rightmost position with stop 126 in engagement with its rightmost stop lug on stop shaft 146. Further switches are necessary to the operation of the electrical circuitry and the operation of the mechanical structure dependent thereon. These further switches are switches 286 and 288, see FIG. 8. Switches 286 and 288 are arranged physically adjacent switches 132 and 134 and are actuated by the carriers 40, 42, 44 and 46 so that switches 286 and 288 are open when the carriers are in the home position shown in FIG. 1, while the switches 132 and 134 are closed when the carriers are in the home position. Similarly, switches 286 and 288 are closed when the carriers are away from their home position while switches 132 and 134 are open when the carriers are away from the home position.

The physical arrangement of the various structures having been described, FIG. 8 will now be described to show the electrical interconnections therebetween so as to cause the appropriate actuation of the various components of the handling equipment 10, in their proper order to result in the desired function.

Referring now to FIG. 8, power line 290 supplies electric power at 115 volts, 60 cycle, A.C., or such other power as is conventionally available. Power line 292 is connected to a supply of suitable power for actuating the various relays in the system. Conventionally 24 volts D.C. is supplied. The other side of each of these power sources is connected to a common, or individual ground return. Line 292 is connected to switch 26. As has been previously described, switch 26 is normally open, and is closed when punch 14 is actuated to punch out coupons. Switch 26 is connected by line 294 to serially connected switches 132 and 134. These switches are closed when the carriers are in the home position. Switch 132 is connected to line 296. Line 296 is connected to coil 298 of relay 300, and the other side of coil 298 is connected to ground. Line 296 is also connected to coil 302 of relay 304, while the other side of coil 302 is also connected to ground. Relay 304 has normally open contacts 306 and 308. Line 310 is connected to both contacts 306 and 308, and contact 306 is connected through line 312 to both motors 106 and 108. Motors 106 and 108 are connected by line 314 to ground. Energization of line 312 causes motors 106 and 108 to run in the forward direction which causes the carriers to move outward from their home position. Line 316 is connected to normally open contacts 308, and is connected to solenoid coil 194. Thus, upon closure of relay 304 motors 106 and 108 run in the forward direction and solenoid 194 is energized to rotate the stop shafts so as to place a new stop in position.

Relay 300 has normally open contacts 318 and 320 and normally closed contact 322. Line 292 is connected by line 324 to normally open contact 318 and normally closed contact 322. Normally open contacts 318 and 320 are connected by line 326 to normally closed switches 152 and 154 which are connected in parallel. Switches 152 and 154 are connected by line 328 to line 296. Thus, closure of switch 26 energizes line 296 so that coils 298 and 302 are energized. This pulls in relays 300 and 304, respectively, to close their normally open contacts and open normally closed contact 322. Closure or normally open contact 318 permits current to flow from line 292 through line 324, contact 318, line 326, either of switches 152 and 154, through line 328 to line 296 to act as a hold in for the two relay coils. Thus, relays are held in until both of switches 152 and 154 are opened. Thus, both motors 106 and 108 run until both of switches 152 and 154 open, indicating that both sets of carriers have reached their maximum outward excursion determined by the appropriately effective stop lugs. Upon reaching the maximum outward excursion, both switches 152 and 154 are opened to open the holding circuit on coils 298 and 302. Current is not supplied through switches 132 and 134, for they are both open since the carriers are away from their home position. It is to be noted that while relay 300 is energized, contact 320 energizes line 330 which is connected to solenoids 66, 70, 72 and 74. These are connected to the pickup arms and when energized hold the pickup arms in the raised position. Thus, the pickup arms are raised while the carriers are on their outward excursion, and are dropped when the carriers reach their outer terminal limits.

Normally closed contact 322 is connected through line 332 to switches 286 and 288, which are connected in parallel. These switches are arranged so that they are opened when the carriers are at their home position, and are closed when the carriers are away from their home position. Thus, when both of the switches 152 and 154 open, switches 286 and 288 are closed. Switches 286 and 288 are connected in parallel to line 334 which is in turn connected to lines 336 and 338. Line 336 is connected to timer 340 and line 338 is connected to timer 342. Timers 340 and 342 are of conventional nature, and are arranged so that after a predetermined time interval, thermal action within the timer causes the closing of contacts therein. Timer 342 closes its contacts sooner than timer 340.

Therefore, the connections of timer 342 will be first described. Timer 342 has ground line 344 which permits continuity to the heater therein. Timer 342 also has an output line 346 which is energized from line 338 after the predetermined time interval. Line 346 is connected to coil 348 of relay 350. The other side of coil 348 is connected to ground. Relay 350 has one set of normally open contacts 352. Power line 290 is connected to normally open contacts 352. Line 354 connects the other side of contacts 352 to solenoid 100 which actuates disc pickup vacuum control valve 84. The manner of energization of coil 100 is such that when the coil 100 is energized, line 82 is open to atmosphere and line 86 is closed so that the discs are no longer held on the pickup arms.

Timer 340 has its input energized at the same time as timer 342, for line 336 is energized at the same time as line 338. Timer 340 has a ground line 356 which permits continuity to the heater within timer 340. Timer 340 has an output line 358 which is connected to coil 360 of relay 362. The other side of coil 360 is connected to ground. Relay 362 has normally open contacts 366 and 368. Line 370 is connected to power line 292 and is connected to contact 366.

Closure of contact 366 supplies power to line 372 which is connected to line 330 and energizes solenoids 66, 70, 72 and 74 so that the pickup arms are picked up. This happens after the vacuum is turned off by the timing out of timer 342.

Line 274 is connected to power line 290 and to normally open contacts 368. Contacts 368 are in turn connected to line 376 which is connected to both of motors 106 and 108 and is connected in such a manner as to cause the motors to operate in the reverse direction. Thus, vacuum is turned off, the pickup arms are picked up and the motors are operated in the reverse direction so that the carriers come back to the home position. When they reach the home position, both of switches 286 and 288 are opened to drop to both relays 350 and 362 to return the equipment to the starting condition.

Line 94 is connected to power line 290 to supply power to the vacuum pump 92. Lines 378 and 380 are connected to parallel line 94. Line 380 is connected to switch 284, which is in turn connected to line 382. Both lines 378 and 382 are connected to timer 384. Timer 384 has a ground 386 and an output line 388. Output line 388 is connected to solenoid coil 272. Timer 384 is a self-contained unit with its own holding circuit. This is the reason for the need of line 378. Timer 384 is connected in such a manner that when switch 284 is closed, timing begins and timing continues independent of the opening of switch 284. After a predetermined length of time, timer 383 energizes line 388 and continues this energization for a further predetermined length of time. The timing is such that line 388 is energized after the timers 340 and 342 are timed out. Thus, after a disc is deposited in the rightmost column, and the pickup arms are picked up, the tray is moved forward to the next row. After the trays are moved forward to a new row, the timer 384 times out its second time interval and deenergizes line 388 to release vacuum from cylinder 364 and restore the tray moving mechanism to its starting position.

When the trays are completely filled, or are as filled as desired, they are removed and further treated in accordance with the biological test procedure. A new set of trays is placed on the tray carrier plates 208 and 210, and they are reset manually to the starting position.

This invention having been described in its preferred embodiment, it is clear that it is susceptible to numerous modifications and changes within the scope of this invention and without the exercise of the inventive faculty. Accordingly, the scope of this invention is determined by the scope of the following claims.

I claim:
1. A device for handling material, said device comprising:
   a base, a punch section, a carrier section and a tray support;
   said punch section being mounted upon said base and having a punch therein adapted to punch a coupon from a card;
   said carrier section having a carrier therein, said carrier being movably mounted with respect to said base;
   said tray support being adapted to carry a tray;
   said carrier being adapted to be driven from a first position adjacent said punch to a second position, said second position being determined by a stop, said carrier being adjacent said tray support when said carrier is positioned by said stop;
   a series of other stops, said stop and said series of stops being arranged so that any of said stops control the second position of said carrier;
   a motor drive connected to drive said carrier from said first position to said second position and from said second position to said first position;
   said tray support being movably mounted with respect to said base so as to be movable in a direction at substantially right angles to the direction from said first position to said second position of said carrier;
   tray support drive means for moving said tray support in successive increments of travel so that said carrier is adapted to position coupons in a plurality of rows on said tray support;
   said tray support drive means being actuated by said carrier when said carrier is in its second position controlled by any one of said stops.

2. A device for positioning coupons, said device having a base, a carrier and a tray support;
   said carrier being movable in a first direction with respect to said base, said carrier being movable from a first positon whereat it is adapted to receive a coupon to a second position whereat it is adapted to deposit a coupon;
   stop means arranged on said base and positioned in association with said carrier, said stop means comprising a stop shaft having an axis extending in said first direction, rotation means connected to said stop shaft to incrementally rotate said stop shaft, a plurality of stop lugs positioned on said stop shaft, said stop lugs being positioned along the length of said stop shaft so that each of said stop lugs determines a different second position of said carrier, said stop lugs being arranged around the circumference of said stop shaft so that only one of said stop lugs is positioned for stop engagement by said carrier at any one time and incremental rotation of said stop shaft presents a different stop lug for stop engagement by said carrier.

3. The structure of claim 2 wherein said stop shaft is axially movable, motor means to drive said carrier from said first position to said second position wherein said carrier engages a stop lug on said stop shaft, said engagement causing axial movement of said stop shaft, a switch positioned adajcent said stop shaft and arranged to be actuated by axial movement of said stop shaft, said switch being connected to said motor means.

4. A device for positioning a coupon, said device comprising:
   a base, a carrier, a coupon delivery section and a coupon deposit section;
   said carrier being movable from a first position adjacent said coupon delivery section to a second position adjacent said coupon deposit section, guide means mounted on said base, said carrier being movably mounted on said guide means for movement from said first position to said second position, motive means connected to said carrier to move said carrier along said guide means from said first position to said second position;
   pickup means on said carrier, said pickup means comprising a hollow pickup arm, said hollow pickup arm being pivoted on said carrier, a solenoid on said carrier for moving said pickup arm about its pivot, a vacuum connection to said pickup arm;
   control means connected to said motive means for moving of said carrier from said first position to said second position, said control means being connected to said solenoid and being connected to said vacuum connection, said control means controlling said carrier so that said arm engages a coupon and holds it by vacuum, said arm is raised by action of said solenoid and said carrier is moved from said first position to said second position while carrying a coupon, and said arm is lowered and said vacuum is discontinued when said carrier is at said second position so as to deposit said coupon at said second position.

5. The structure of claim 4 wherein said second position is determined by selectable stop means and said selectable stop means is selected between successive excursions of said carrier along said guide means so that successive coupons are deposited at different second positions.

6. A device adapted for the positioning of coupons, said device comprising:
   a base, a punch section, a carrier section, and a coupon receiving section;
   said base having first guide rails thereon and second guide rails thereon, said first and second guide rails being positioned at substantially right angles with respect to each other;
   said punch section being adapted to punch a coupon from a card and to deliver the punched coupon to a first position, said punch section being mounted on said base;
   said coupon receiving section comprising a carrier plate mounted upon said first guide rails so as to be movable in a first direction, a cylinder mounted on said base, a gear, said gear being connected to be rotated by said cylinder, a rack mounted upon said carrier, said gear being in engagement with said rack so that actuation of said cylinder causes motion of said carrier plate in a first direction along said first rails, said carrier plate being adapted to carry at least one tray;
   at least one carrier mounted for motion along said second rails so as to define motion of said carrier in a second direction, said carrier being adapted to be moved from a first position adjacent said punch means to a second position, stop means positioned in association with said carrier, said stop means comprising a stop shaft, stop lugs positioned along the length of said stop shaft, said stop lugs being positioned circumferentially about said stop shaft, stop motive means connected to said stop shaft to rotate said stop shaft so that successive stop lugs thereon are positioned to be active, said carrier being positioned with respect to said stop shaft so that said carrier when moving from said first to said second position engages said active stop lug on said stop shaft, which active stop lug determines said second position, said stop shaft being axially movable by said carrier moving into engagement with said active stop lug at said second position by action of said carrier motive means causing axial motion of said stop shaft, a switch positioned in association with said stop shaft and arranged so that axial motion of said stop shaft causes actuation of said switch, said switch causing actuation of said stop shaft rotating means so that successive excursions of said carrier from said first to said second position terminate at different second positions due to rotation of said stop shaft;

a further switch positioned for actuation by said carrier when said carrier is in engagement with a particular stop lug, said further switch being connected to actuate said cylinder; and control means for controlling said cylinder, said carrier motive means and said stop shaft rotating means, said control means causing actuation of said carrier motive means when said punch means is actuated and causing deposition of a coupon and return of said carrier when said stop shaft operated switch is actuated.

7. The structure of claim 6 wherein at least first and second carriers are positioned for motion along said second guide means, said first carrier being positioned for engagement with one of said stop lugs and said second carrier being connected to said first carrier, said connection between said first carrier and said second carrier being controlled by first and second stops, said first stop limiting the minimum distance between said carriers and said second stop limiting the maximum distance between said carriers, said carrier motive means being connected to drive said second carrier and said stop means being connected to drive said first carrier after said second carrier reaches the maximum distance away from said first carrier.

8. A testing device which includes:
means for holding a sample;
removing means for removing a specimen from said sample;
a carrier means, said carrier means being capable of being moved from an initial position adjacent to said removing means to another position remote from said holding means;
support means for holding and thereafter discharging a specimen removed from a sample by said removing means, said support means being mounted on said carrier means;
a receiving means located remote from said removing means and said holding means adjacent to said other position;
actuating means for causing operation of said removing means so as to cause removal of a specimen from a sample held by said holding means, to thereafter cause a specimen removed by said removing means to be supported by said support means on said carrier means, to thereafter cause said carrier means, said support means and a sample held by said support means to be moved to said other position, to thereafter cause said specimen held by said support means to be discharged from said support means onto said receiving means, and to thereafter cause said carrier means to be returned to said position adjacent to said holding means.

9. A testing device as claimed in claim 8 wherein: said removing means is a punch.

10. A testing device as claimed in claim 8 wherein: said support means comprises vacuum tube means for holding a specimen by a vacuum.

11. A testing device as claimed in claim 8 wherein: said receiving means is a tray.

12. A testing device as claimed in claim 11 wherein: said tray is movably mounted; and
said actuating means periodically moves said tray with respect to said carrier means during the operation of said device so that specimens are deposited in different positions of said tray.

13. A testing device as claimed in claim 8 wherein:
said removing means is a punch;
said support means comprises vacuum tube means for holding a specimen by a vacuum;
said receiving means is a tray;
said tray is movably mounted; and
said actuating means periodically moves said tray with respect to said carrier means during the operation of said device so that specimens are deposited in different positions of said tray.

14. A testing device as claimed in claim 8 wherein:
said carrier means is capable of being moved to a plurality of said other positions;
each time such actuating means is actuated said carrier means is moved so as to go from one of said other positions to an adjacent of said other positions in a sequential manner.

15. A testing device as claimed in claim 14 wherein:
said receiving means is a tray;
said tray is movably mounted;
same actuating means periodically moves said tray with respect to said carrier means during the operation of said device so that specimens are deposited in different positions in said tray.

16. A testing device as claimed in claim 8 including:
a plurality of said carrier means;
a plurality of said support means, each of said support means being mounted on one of said carrier means;
said other positions are different for each of said carrier means;
a plurality of said receiving means, each of said receiving means being located adjacent to said other positions of each of said carrier means.

17. A testing device as claimed in claim 16 wherein:
each of said carrier means is capable of being moved to a plurality of said other positions;
each time said actuating means actuates said carrier means all of said carrier means are simultaneously actuated;
and each of said carrier means is moved so as to go from an initial position adjacent to said removing means from one of the said other positions to an adjacent of said other positions in a sequential manner.

18. A testing device as claimed in claim 17 wherein:
each of said receiving means is a tray;
each of said trays is movably mounted;
said actuating means periodically moves each of said trays with respect to said carrier means during the operation said device so that specimens are deposited in different positions in said tray.

19. A testing device as claimed in claim 8 wherein:
said removing means is a punch;
each of said support means comprises vacuum tube means for holding a specimen by a vacuum.

References Cited

UNITED STATES PATENTS 2,664,833   1/1954   Armstrong et al.   53—123

TRAVIS S. McGEHEE, *Primary Examiner.*

E. F. DESMOND, *Assistant Examiner.*

U.S. Cl. X.R.

53—160; 73—421; 83—152